(12) United States Patent
Crimi et al.

(10) Patent No.: US 8,195,783 B2
(45) Date of Patent: Jun. 5, 2012

(54) FLEXIBLE RATING RULES AND CALENDER RULES IMPLEMENTED IN A REAL-TIME CHARGING SYSTEM FOR A TELECOMMUNICATIONS NETWORK

(75) Inventors: Joseph Crimi, Tinton Falls, NJ (US); Alan Hopson, Oceanport, NJ (US); Jeff Hsu, Metuchen, NJ (US); Robert Johnson, Englishtown, NJ (US); Cathryn S. McMahon, Red Bank, NJ (US); Amanullah Mir, Newton, PA (US); Dinesh Nettar, New Providence, NJ (US); Glenn Silverstein, New Providence, NJ (US); Arvind Gupla, Chennai (IN); Richard Stilborn, Bernardsville, NJ (US)

(73) Assignee: Intellectual Ventures II LLC, Wilmington, DE (US)

( * ) Notice: Subject to any disclaimer, the term of this patent is extended or adjusted under 35 U.S.C. 154(b) by 1231 days.

(21) Appl. No.: 11/807,002

(22) Filed: May 25, 2007

(65) Prior Publication Data

US 2008/0014904 A1    Jan. 17, 2008

Related U.S. Application Data

(60) Provisional application No. 60/808,667, filed on May 26, 2006, provisional application No. 60/808,670, filed on May 26, 2006, provisional application No. 60/808,712, filed on May 26, 2006.

(51) Int. Cl.
*G06F 15/173* (2006.01)
*H04M 15/00* (2006.01)

(52) U.S. Cl. ....... 709/223; 705/34; 455/406; 455/414.1; 379/114.03

(58) Field of Classification Search ............. 370/114.01, 370/255; 455/406–408, 414.1; 705/30, 34; 379/114.01, 114.03, 114.09, 114.12, 114.28; 709/203, 219, 223

See application file for complete search history.

(56) References Cited

U.S. PATENT DOCUMENTS 6,542,593 B1 * 4/2003 Bowman-Amuah ..... 379/201.03
6,707,812 B1 * 3/2004 Bowman-Amuah .......... 370/353

(Continued)

FOREIGN PATENT DOCUMENTS

EP            1475947          11/2004

(Continued)

OTHER PUBLICATIONS

Supplementary European Search Report for EP 09 80 9216 dated Jan. 6, 2010.

(Continued)

*Primary Examiner* — Andrew Joseph Rudy (57) ABSTRACT

By coupling a rating engine with call processing, rating rules are generated that enable a flexible interface between call process and call rating without necessitating that fixed data be passed between them. The real time charging system (RCS) provides a process that creates a generic entity, called a bucket, and uses it to keep track of account information and/or to count types of usage. The bucket allows an operator to define accounts and usage counters and how they are used as part of the rating rules. Use of these buckets is defined in rating rules, thus turning control over subscriber account and usage counters to the network operator. Further, the RCS provides a calendar option for limiting times during which calls to general telephone numbers can be made or received.

22 Claims, 5 Drawing Sheets

U.S. PATENT DOCUMENTS

| | | | |
|---|---|---|---|
| 7,440,441 B2 * | 10/2008 | Lakhani et al. | 370/352 |
| 7,450,591 B2 * | 11/2008 | Korling et al. | 370/395.43 |
| 7,640,213 B2 * | 12/2009 | Reunert et al. | 705/40 |
| 7,660,755 B2 * | 2/2010 | Amato et al. | 705/34 |
| 7,697,672 B2 * | 4/2010 | Cesarini | 379/114.03 |
| 7,917,394 B2 * | 3/2011 | Borelli et al. | 705/26.1 |
| 8,027,334 B2 * | 9/2011 | Lakhani et al. | 370/352 |
| 2004/0103191 A1 | 5/2004 | Larsson | |
| 2004/0125755 A1 | 7/2004 | Roberts | |
| 2005/0065880 A1 | 3/2005 | Amato et al. | |
| 2006/0008063 A1 | 1/2006 | Harnesk et al. | |
| 2006/0058010 A1 | 3/2006 | Williams et al. | |

FOREIGN PATENT DOCUMENTS

| | | |
|---|---|---|
| JP | 03-270398 | 12/1991 |
| JP | 10-079812 | 3/1998 |
| JP | 11-069019 | 3/1999 |
| JP | 2003-018333 | 1/2003 |
| WO | 03/094494 | 11/2003 |
| WO | 2004/036825 | 4/2004 |
| WO | WO-2005/062598 | 7/2005 |
| WO | WO-2005/076589 | 8/2005 |
| WO | 2005/050967 | 6/2006 |
| WO | 2007/140007 | 12/2007 |

OTHER PUBLICATIONS

International Search Report for PCT/US07/12634 mailed Feb. 21, 2008.

Japanese Patent Office, Official Notice of Rejection for Japanese Pat. App. No. 2009-513232, mailed Jan. 18, 2011.

Written Opinion of the International Searching Authority for PCT Pat. App. No. PCT/US07/12634, mailed Feb. 21, 2008.

International Preliminary Report on Patentability for PCT Pat. App. No. PCT/US07/12634, completed Nov. 14, 2008.

Decision to Grant a Patent for Japanese Application 2009-513232, mailed Dec. 20, 2011 (with English translation).

* cited by examiner

| BALANCE BUCKETS | | | | 54 |
|---|---|---|---|---|
| BUCKET TYPE | START DATE | EXPIRY DATE | AMOUNT | |
| CORE BALANCE | 1/1/2005 | 1/1/2008 | 100.00 | |
| SMS | 2/1/2006 | 1/1/2008 | 2 | |
| BONUS VOICE MINUTES | 1/1/2006 | 1/1/2008 | 20 | |

| USAGE BUCKETS | | | 64 |
|---|---|---|---|
| BUCKET TYPE | NEXT RESET DATE | AMOUNT | |
| TOTAL AMOUNT | 1/1/2008 | 1450 | |
| MONTHLY TOTAL | 6/1/2007 | 45 | |

FLEXIBLE RATING RULES AND CALENDER RULES IMPLEMENTED IN A REAL-TIME CHARGING SYSTEM FOR A TELECOMMUNICATIONS NETWORK

CROSS REFERENCE TO RELATED APPLICATION

The present invention claims benefit of U.S. provisional patent application 60/808,667 filed May 26, 2006, U.S. provisional patent application 60/808,670 filed May 26, 2006, U.S. provisional patent application 60/808,712 filed May 26, 2006. The entire content and disclosure of each provisional patent application is incorporated herein by reference.

FIELD OF THE INVENTION

The present invention relates generally to the field of wireless and wireline telecommunications networks and specifically to the creation and implementation of services for charging subscribers for usage of such networks.

BACKGROUND OF THE INVENTION

Telecommunication network operators providing telecommunications services such as wireless voice and data services face significant competition for both prepaid and postpaid accounts. To attract new subscribers and retain existing subscribers in this highly competitive industry, the telecommunication network operator or service provider must be able to introduce a variety of services in a timely manner. An important factor in the implementation of new services is the ability to quickly change service offerings based on the service provider's approach to the market and on competitors' offerings. Service providers can react to competitors' changes in a variety of ways including reconfiguring the provider's service features and options, issuing promotions, offering bonuses, and providing loyalty programs. Accordingly, it is very important to have the ability to create and modify rating plans and promotions for new and existing services without incurring long development cycles, or requiring modifications to the rating parameters of other, unrelated services.

Providers of telecommunication services are rethinking the paradigms for service rating and charging, desiring to move away from the current "flat-fee" or "per megabyte" schemes. A more dynamic rating system that considers the type of content and the quality of service, and that can offer more value to subscribers is needed to support the demand for new services. To realize full revenue potentials, it is imperative that charges for new services be based on their perceived value to the subscriber. Unfortunately, at present, the service provider often has to introduce new services at a flat rate because the market is ready for new services before corresponding service rating and charging systems can be upgraded to charge for the new services in another fashion.

Rating engines must be able to perform in a real-time fashion and, at the same time, allow for the implementation of new rating plans and promotions in a simple and timely manner. Rule-based rating systems enable the user to add new offerings and change existing offerings simply by adding and modifying rating rules. However, to gain real-time efficiency, the rule languages often are restrictive. One alternative is functional rating, which uses mathematical functions, expressions, and table references that contain conditions and pricing components of rules. The incorporation of functional rating into the rules language can greatly reduce the number of rules needed to implement a pricing policy, and enables the expression of complex rules without the need for modifying executable code.

Moreover, as telecommunication network operators and service providers transition from circuit-switched to packet-based next generation networks, their charging infrastructure must not only support existing services but also include new capabilities available in the IP domain. Hence, a single solution that supports convergence of voice, short messaging services (SMS) and data/digital content is needed. The platform should operate in both the prepaid and postpaid environment, and should be capable of charging for both circuit switched (SS7) and IP Multimedia Subsystem (IMS).

Additionally, a service provider often needs to define multiple accounts or counters for a subscriber, and, in complicated prepaid and postpaid charging applications, there is a need for simultaneous handling of multiple subscriber accounts and counters. Currently, only fixed use accounts or counters, and other charging systems which use a fixed hard-coded number of account balances and usage counters are available in charging applications. These accounts and counters can only be used for their original, intended purpose, such as for a single account for free SMS, and a counter for monthly SMS usage. Because traditionally these accounts and counters are hard-coded, software modifications are required for every new service capability or business offering. This is an inadequate solution for today's fast changing business needs.

There is a further need, particularly for wireless phone service, to limit the times during the day and/or week when calls can be made or received. It is also necessary to permit these calendar restrictions to be to selectively bypassed, to allow for calls to or from certain numbers to occur, even during a restricted period. Two common examples are as follows. In the first, a parent might want to give her child a mobile phone, but may not want the child to be able to use that phone during school hours, church hours, dinner time, or late at night. However, the parent also might want the ability to always be able to call that child on his or her mobile phone, regardless of any calendar restrictions. The parent might also want calls to and from grandparents, next door neighbors, or specific others to always be allowed. In the second, an employer might want to provide mobile phones to his employees, but may not want them to be able to use the phones during off-hours or over the weekend for personal use. However, the employer may want to always allow calls to and from certain numbers associated with the business, even during restricted periods.

Accordingly, the list of numbers that will always be allowed, i.e., that will bypass the calendar restrictions, should be configurable on a number of different hierarchical levels. For example, it could be configured across all of the service provider's subscribers, across all subscribers within a particular plan, or on an individual subscriber's level.

Consequently, there is a need, particularly for wireless real-time phone service, e.g. prepaid, to be able to charge and/or track usage using a variety of accounts, counters, or other entities, particularly at different hierarchical levels. This capability can be particularly useful for families, where certain accounts apply at the family-wide level while other accounts apply at the individual family member level. It can also be useful for enterprise customers, where certain accounts apply at the organization-wide or department-wide level, while other accounts apply at the individual employee's level.

Others have solved this problem through the use of back-office systems that may be near-real-time but non-real-time.

These systems use network generated data that is delivered at some frequency after call/session/event termination to analyze a function, and allocate its charge to the appropriate account or entity. Some functions, e.g., call/session control, cannot be done at all in a non-real-time system. Other functions, e.g., tracking & managing usage by account or entity, are less effective non-real-time.

Finally, it is desirable to be able to determine billing based on the identity of the calling party and/or the called party.

BRIEF SUMMARY OF THE INVENTION

The present invention provides a system and method for charging and tracking usage across multiple buckets at different hierarchical levels in a real-time system. The solution provides two distinct types of buckets. Usage Buckets are reset to zero at start of each pre-configured cycle, e.g., daily, weekly, monthly, annually, etc., and count up or increase in value to provide real-time tracking of usage. Balance Buckets are set at some value (e.g., based on manual top-ups, automatic monthly allotments, etc.), and count down or decrease the initial value based on actual usage. The solution allows for multiple Usage and Balance buckets to be defined so that usage can be tracked and/or charged for different services and types of usage at different hierarchical levels.

In addition, the present invention provides a way to use signaling (e.g., SS7) between the network switches and an off-board server (e.g., Telcordia's Converged Application Server), which implements the calendar restrictions and selective bypass functionality. In addition, the ability for the end user to manage those services is provided.

By tightly coupling the call rating engine with the service logic or call processing system, the present invention is able to generate rating rules that could refer to any of the following in real-time from a rating rule: call context data such as location of a party; services configuration data such as allowed services for a subscriber's class of service; and, subscriber data such as class of service. A flexible interface between call process and rating that does not require fixed data to be passed between the two is created. Also, in this rule-based real-time charging system, a generic entity called a bucket is used to keep track of account information and/or to count types of usage. The bucket enables an operator to define accounts and usage counters and how they are used, as part of the rating rules. The way these buckets are used is defined in rating rules, thus turning control over subscriber account and usage counters to the network operator. As a result, when an operator identifies a need for a new counter to fulfill a new business, the operator only needs to define the rating rule for the counter and its corresponding bucket.

DETAILED DESCRIPTION

Figure 1:
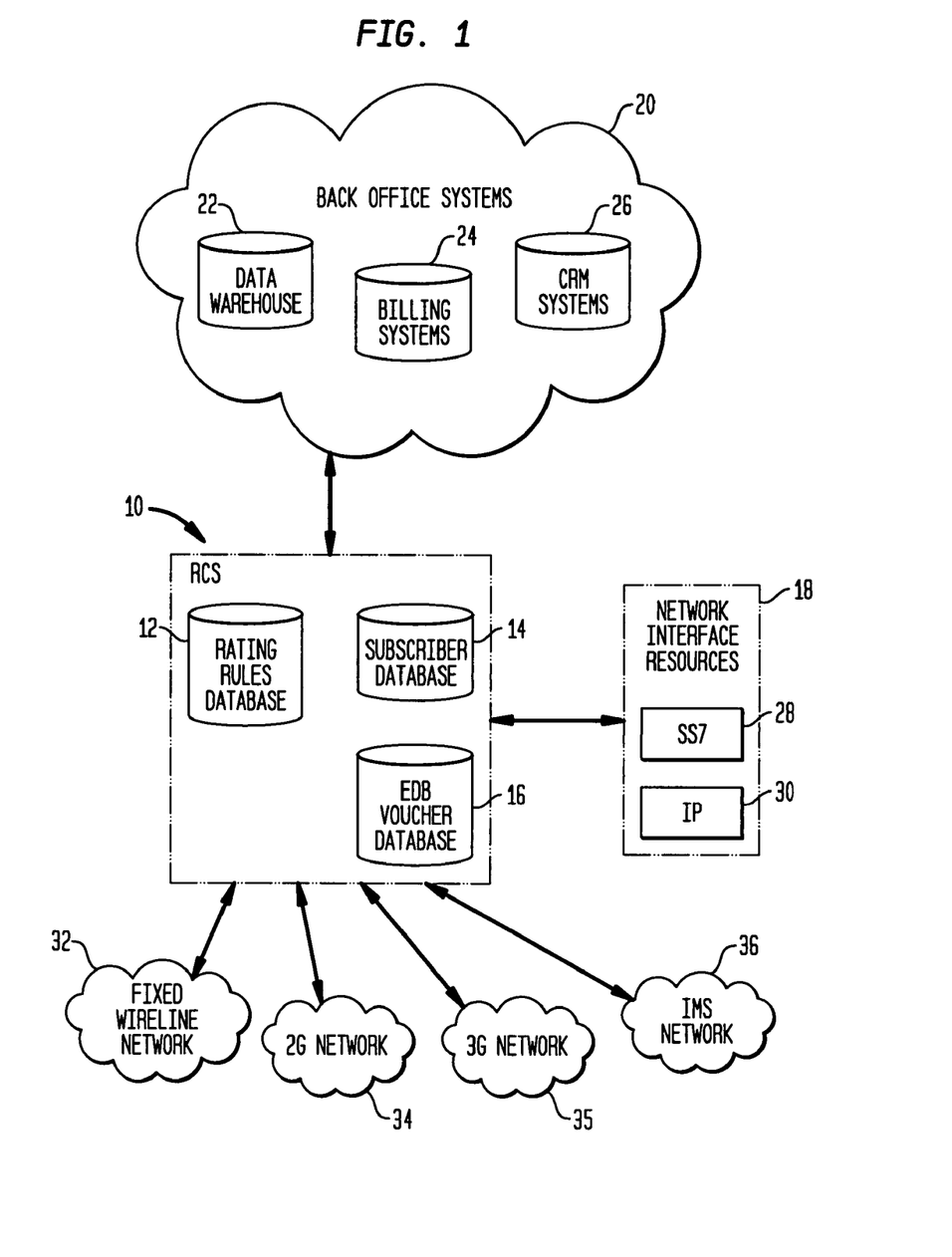
FIG. 1 is a depiction of the overall architecture of a network implementing an embodiment of the system of the present invention.

Referring to FIG. 1, a real-time charging system (RCS) 10 is a set of computer software and databases implemented on one or more general purpose computers. RCS 10 comprises a set of rating rules 12, a customer database 14, an EDB voucher database 16 and network interface resources 18 in addition to service logic 46 and a rating engine 48 depicted in FIG. 2 and discussed further below. RCS 10 can be implemented as part of a Converged Application Server (CAS) or Service Control Point (SCP), both of which are known in the industry.

Rating rules database 12 comprises the set of rules accessed by the RCS 10 in order to establish the cost of a voice call, SMS message, ringtone download, or other service provided to a customer (also referred to as a subscriber). Customer or subscriber database 14 is used to maintain information about the profile of the subscriber including information regarding the services available to the customer and information regarding the customers' personal preferences and programs, such as Friends & Family (F&F). EDB voucher database 16 maintains information regarding the vouchers that can be used by a customer/subscriber to pay for services. The EBD voucher database 16 is described further below.

RCS 10 is in communication with a plurality of back office systems 20 including, but not limited to, a data warehouse 22, a billing system 24, and a customer relationship manager (CRM) system 26. Data warehouse 22 is a database of call detail records (CDRs) and measurement data. In a preferred embodiment of the present invention, SQLnet is used by the data warehouse 22 to retrieve CDRs and measurement data from the RCS 10. Alternatively, CDRs can be written in ASCII format and can be retrieved using a file transfer protocol (ftp). Billing System 24 is the system that generates paper or other versions of a human readable bill, for telecommunications services, that can be transmitted to the customer/subscriber. CRM system 26 is a customer relationship manager system used for initial provisioning of subscribers. In a preferred embodiment of the present system, the SPACE IDL Interface (SII) and an open Common Object Request Broker Architecture (CORBA) interface from the RCS 10 to the CRM system 26 are supported. For subsequent account updates, information in the CRM system 26 can be modified using the Integrated Service Access (ISA) interface.

RCS 10 communicates with a plurality of networks through network interface resources 18 including SS7 interfaces 28 and IP interfaces 30. RCS 10 communicates with one or more fixed wireline networks 32 through Intelligent Network Application Part (INAP) and Advance Intelligent Network (AIN) messaging. RCS 10 communicates with second generation (2G) wireless networks 34 through INAP, Mobile Application Part (MAP), Customized Applications for Mobile network Enhanced Logic Application Part (CAP), Wireless Intelligent Network (WIN) and ANSI41 messages. In addition to call information, 2G wireless networks provide information to the RCS 10 from the home location register (HLR) database (not shown) and the Short Message Service center (SMC) database (not shown). The RCS 10 communicates with third generation (3G) wireless networks 35 through Data Charging Interface (DCI), Short Message Peer to Peer Protocol (SMPP), Simple Mail Transfer Protocol (SMTP) and general packet radio service (GPRS). RCS 10 communicates with content servers, the content gateway server, SMPP gateway and SMTP gateway. Access is provided to information in the Authentication, Authorization, and Accounting (AAA) database (not shown) and to web servers (not shown) used for account management through an ISA interface and a web portal at the service provider. RCS 10 communicates with IP IMS networks 36 using Session Initiation Protocol (SIP), Voice XML (VXML) and DIAMETER messaging. Further, RCS 10 supports Global System for Mobile Communications (GSM) and American National Standards Institute (ANSI) protocols, as well as IP protocols.

Figure 2:
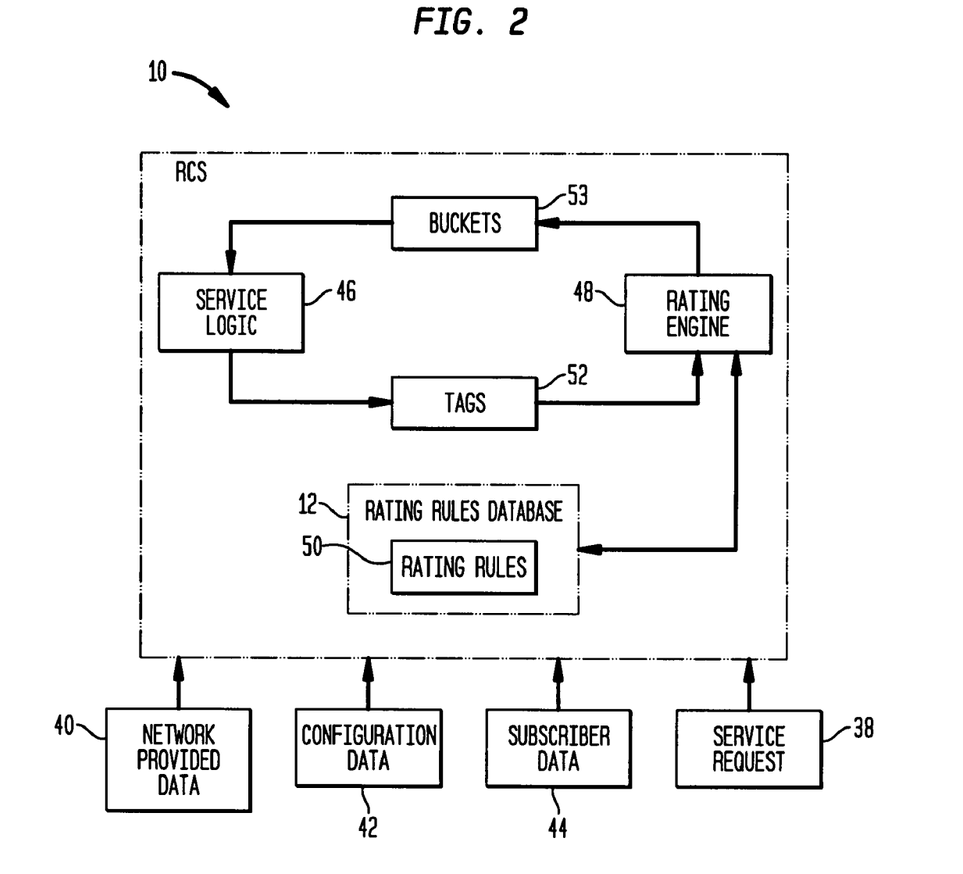
FIG. 2 is a depiction of data flow in a network implementing the present invention.

FIG. 2 depicts the flow of data into and out of an RCS 10 as shown in FIG. 1, in accordance with the present invention. A service request 38, e.g. a voice call, message, data service, etc., is send via the network 32, 34, 35, 36 to the RCS 10. Network provided data 40, configuration data 42 and subscriber data 44, along with the service request 38, are used by the service executor and call context logic or service logic 46 to determine the charge for the specific service request 38. Service logic 46 communicates with the rating engine 48 which executes the rating rules 50 from rating rules database 12 in order to rate or determine a charge for the service request 38.

Specifically, service logic 46 implemented in the RCS 10 uses information provided by the service request 38 along with the network provided data 40, e.g. dialed digits, location, etc., configuration data 42, e.g. services that are allowed with this class of service, special number definitions, etc., and subscriber related data or subscriber account information 44 to produce a set of tags 52 to include as input data to the rating engine 48. The rating engine 48 of the RCS 10 uses these tags 52 to determine which rules in the rule-set or rating rules 50 are applicable for the transaction or executed service request 38. The selected rules are then processed by priority to determine which rule elements apply.

A subscriber record or subscriber data 44 consists of a variable set of data blocks representing various aspects of the subscriber's prepaid plan, e.g., buckets, screening lists, PIN, etc. Each block contains information that may be used by the service logic 46 (state variable, screening lists, etc.) or by the rating engine 48. The rating related information in the subscriber record consists of both relatively fixed data, e.g. price plans, activity dates, etc., and of highly variable data, e.g. buckets 53.

As discussed above, the service logic 46 is responsible for mapping the service request and associated data into tags 52 that the rating engine 48 uses. For example, the service logic 46 maps the current location provided by the network to a zone and compares this with the home zone parameter in the subscriber record. If a match is found, the home zone rater tag is set so the appropriate rate and discount rules can be used. Similarly, the service logic 46 compares the dialed digits with the numbers on the F&F list and sets the F&F rater tag so the appropriate rules are selected.

Figure 3:
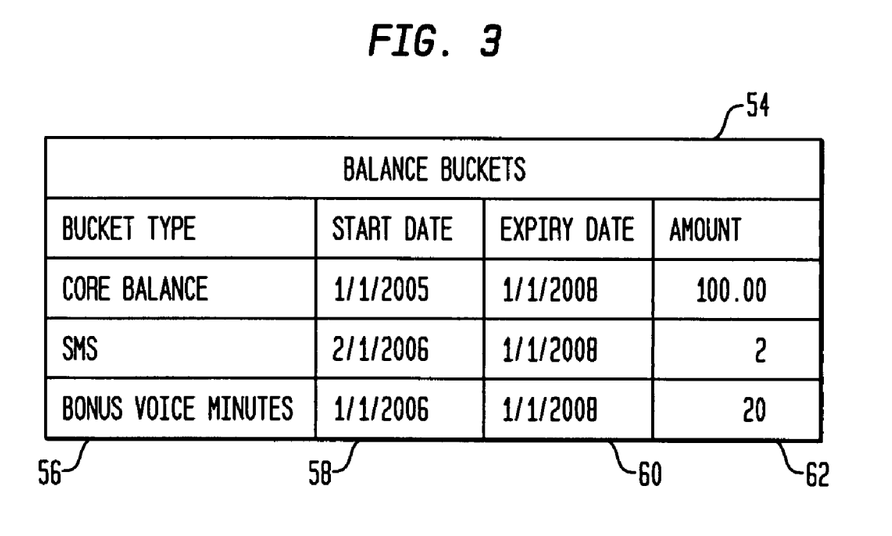
FIG. 3 is a depiction of a balance bucket database in accordance with an embodiment of the present invention.
Figure 4:
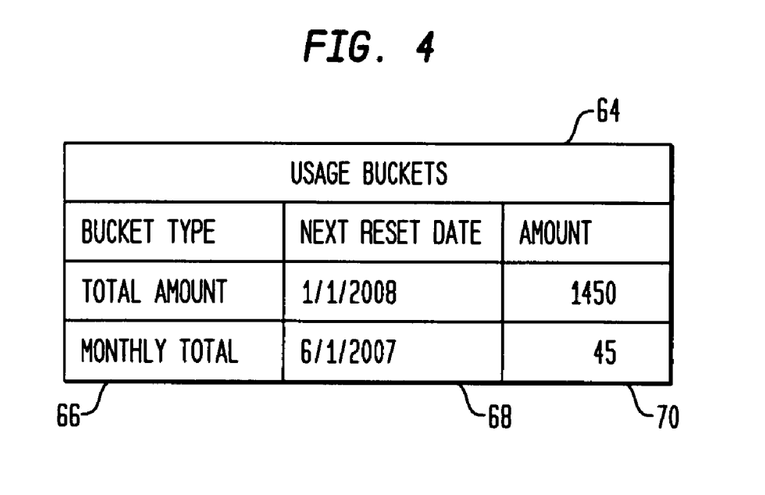
FIG. 4 is a depiction of a usage bucket database in accordance with an embodiment of the present invention.

RCS 10 uniquely generates the buckets 53 by the rules based rating engine 48. These buckets 53, shown in FIGS. 3 and 4, are two distinct kinds of containers that are used to store account balances. Balance buckets 54 represent discrete quantities of currency (e.g., Euros, Dollars, etc.), units (voice minutes, bytes) or events (SMS messages, ringtones) available for the subscriber to spend. Balance buckets 54 are used to store top-ups, earned rewards and active subscriptions. Usage buckets 64, the second type of bucket, represent quantities of money, minutes, messages, or events already spent. Usage history can be used to determine bonus awards. These buckets 53 are fully configurable by the operator.

The rating engine 48 reads the bucket data directly from the subscriber record and returns a set of new buckets along with bucket deltas, that is, balance and usage change information for existing buckets, to the service logic 46. Specifically, the rating engine 48 of the RCS 10 queries the service logic 46 for subscriber account information and transaction information obtained from the service request 38 or input data. In light of this data, the rating engine 48 reviews the appropriate rules to find the appropriate rating rule 12 from which to determine charging details, that is, the price to charge for the transaction. Once determined, the charging details, in the form of bucket information and/or bucket deltas, are forwarded to the service logic 46 to update the subscriber's balance and usage buckets and to generate a CDR. The rating engine 48 is described in more detail below.

When a rating rule 12 triggers the need for a new balance bucket, the rating engine 48 passes back the new bucket information including type, amount, expire/next reset date, and start date, to the service logic 46 which creates the new bucket and continues processing the service request 38. If the new bucket is a usage counter, it will contain a type flag which is used by the rating engine 48 to indicate for what rules this counter is used, and an amount of what this counter is counting, as determined by the rating rules 12, and a reset date. For example, if the counter is counting voice minutes used per month, then the reset date would be the first of the month. Counters are reset, if needed, during first call of the day activity.

If the bucket is a bonus being awarded, the type indicates for what type of service this bonus can be used. The value can be a number to indicate things like free SMS or free in-network voice minutes, or monetary amount, like an extra $50 because the subscriber has just topped-up with $1,000.

When the start date is a date in the future, or if the expire date for the bucket has passed, the bucket cannot be used in rating the call. Buckets that have exceeded their expiration date by one day are removed after a grace period during first call of the day activity. A special CDR is produced to show this action.

Each subscriber has a master balance bucket, called the core balance bucket denominated in a currency, and up to twenty four additional balance buckets. To start a transaction, the core bucket must contain a minimum allowed balance, and can also have a predetermined maximum allowed balance. Each of the remaining twenty four balance buckets depends on and corresponds to the subscriber's particular price plan and profile. These balance buckets are fully configurable by the operator and can represent the subscriber's balances, such as 500 free minutes per month, promotional balances, such as ten free SMS messages, and subscription features, such as free nights and weekends. Buckets 53 are designed to be dynamically created and deleted and, as such, not all subscribers will have buckets of a given type at all times and some subscribers may never have buckets of some types.

Balance buckets 54 are created as follows: (i) through initial provisioning; (ii) during account activation; (iii) during awarding of a bonus; (iv) during periodic charging; (v) during recharge by vouchers or from external payment gateways; and (vi) by external systems such as a web-based self-management application or directly by a customer service representative (CSR).

Buckets have expiration dates and once the expiration date has past, the bucket's balance cannot be used. After a per bucket type configurable grace period, defined in number of days for each bucket type, expired buckets are automatically removed from the account. The grace period allows the subscriber to retain the balance and extend the expiration date if a certain activity, such as a recharge, is performed within the grace period. A CDR is generated to record the balance of the bucket at the time of its deletion.

An example of a balance bucket database is set forth in FIG. 3. The example database contains four fields per balance bucket 54. Field 56 is the bucket type, or bucket type identifier, which could be voice, SMS, ringtones or other types. Field 58 is the value or amount of the bucket in minutes, currency, messages, downloads or other type of counter. Field 60 is the start date for the bucket, i.e., the date the bucket becomes effective or available for use. Field 62 is the expiration date or, for usage buckets, the next reset date.

The operator defines the set of balance buckets 54 to use and the order in which deductions are made from the buckets for each rate rule 50 applied by the rating engine 48. For example, the operator may define that promotional balance buckets are spent first, followed by buckets matching the charged transaction type, e.g., SMS, and finally, once all other appropriate buckets are spent, the core balance bucket is charged. Rate rules 50 also specify the minimum balance allowed for each bucket type during a transaction; the default is zero.

The embodiment of FIG. 3 shows balance buckets 54 having four characteristics: bucket type 56, amount 58, start date 60 and expiration date 62. Bucket "types" 56 are string names describing the buckets' contents; these identifiers are created by the service provider and are used in the rating rules 50. The bucket types 56 identify the kind of balance the bucket contains, e.g., currency, minutes, SMS messages, Bonus currency, Bonus SMS messages, Bonus units, etc. The "amount" 58 contains the balance, that is, number of minutes, currency, etc., available in the bucket. The "start date" 60 is the date when the contents of the bucket become available for use, and the "expiration date" 62 is the date when contents of the bucket are no longer available. Multiple buckets of the same bucket type with different expiration dates, or the same expiration dates but different start dates, can co-exist. For example, multiple promotional balances of the same bucket type enable definition of multiple time-limited bonuses such as one free ring-tone this week and ten free ringtones this month. Buckets of the same type are used in the order of earliest start date then earliest expiration date.

Usage buckets 64 or history counters represent quantities already spent. Usage buckets 64 segregate types of usage and are used to determine bonuses and discounts to be awarded to a subscriber. There can be up to twenty-five of these usage buckets 64 and, like the balance buckets 54, all are also fully definable by the operator. In the embodiment illustrated in FIG. 4, usage buckets 64 have the following three characteristics: bucket type 66, next reset date 68 and amount 70. For each usage bucket type 66, the following two characteristics may be set: period and expiration date. The usage bucket "type" 66 identifies the usage type contained by the bucket, e.g., currency, minutes, SMS messages, bonus currency, bonus units, etc. The "next reset date" 68 is used to identify the day of the month that the usage count is reset to zero for monthly usage buckets. The "amount" 70 is the current usage in the specified period of time. The "period" is the amount of time over which the count is maintained, e.g. daily, weekly, monthly or yearly. Buckets are reset on the first transaction that occurs in the specified period. The "expiration date" is the date on which the bucket is deleted. Usage buckets 64, like balance buckets 54, are dynamically created and deleted. Similar to balance buckets 54, a specific subscriber may not use every type of usage bucket 64.

RCS 10 tracks and makes decisions about subscriber and account usage through the use of buckets, as described above, while operating in real-time, in contrast with prior solutions which have done the tracking and decision-making only in non-real time. In addition, this solution not only manages individual subscriber buckets, but it can also manage a hierarchy of buckets for multiple subscribers in one account. In one example of hierarchical buckets, based upon the address of the message, a child's usage may either be charged to the parent's bucket or to the child's bucket. A parent may want calls to home to be charged to the parent bucket while calls to friends are charged to the child's bucket. In a second example, usage can be tracked for a family as the sum of all of the buckets in the family.

Hence, a real-time solution reduces the risk of fraud or mis-information associated with a non-real time solution. For example, if a child has a limit of fifteen text messages per day, and a non-real-time system is tracking text messages, the child could be at fourteen messages at the end of one tracking period, such as a fifteen minute period, and therefore continued transactions would not be blocked. However, the child could easily send another ten text messages in the next fifteen minutes, or next tracking period, and thus would have sent twenty four text messages rather than the allowed fifteen. Consequently, the parent may be dissatisfied since the service did not provide the management that was requested. Further, the parent may be charged additional fees above the desired limit, and he or she may not be willing to pay this additional charge. In a prepaid environment, or a non-real-time tracking environment, there is no way to recover the cost of the additional nine messages, above the fifteen message limit that had been purchased.

The bucket hierarchy also allows for the flexibility in charging and managing fees that is not possible without the hierarchy. For example, the ability to charge designated transactions to a specific bucket based upon the type and address of the transaction is not possible without a hierarchical solution.

Figure 5:
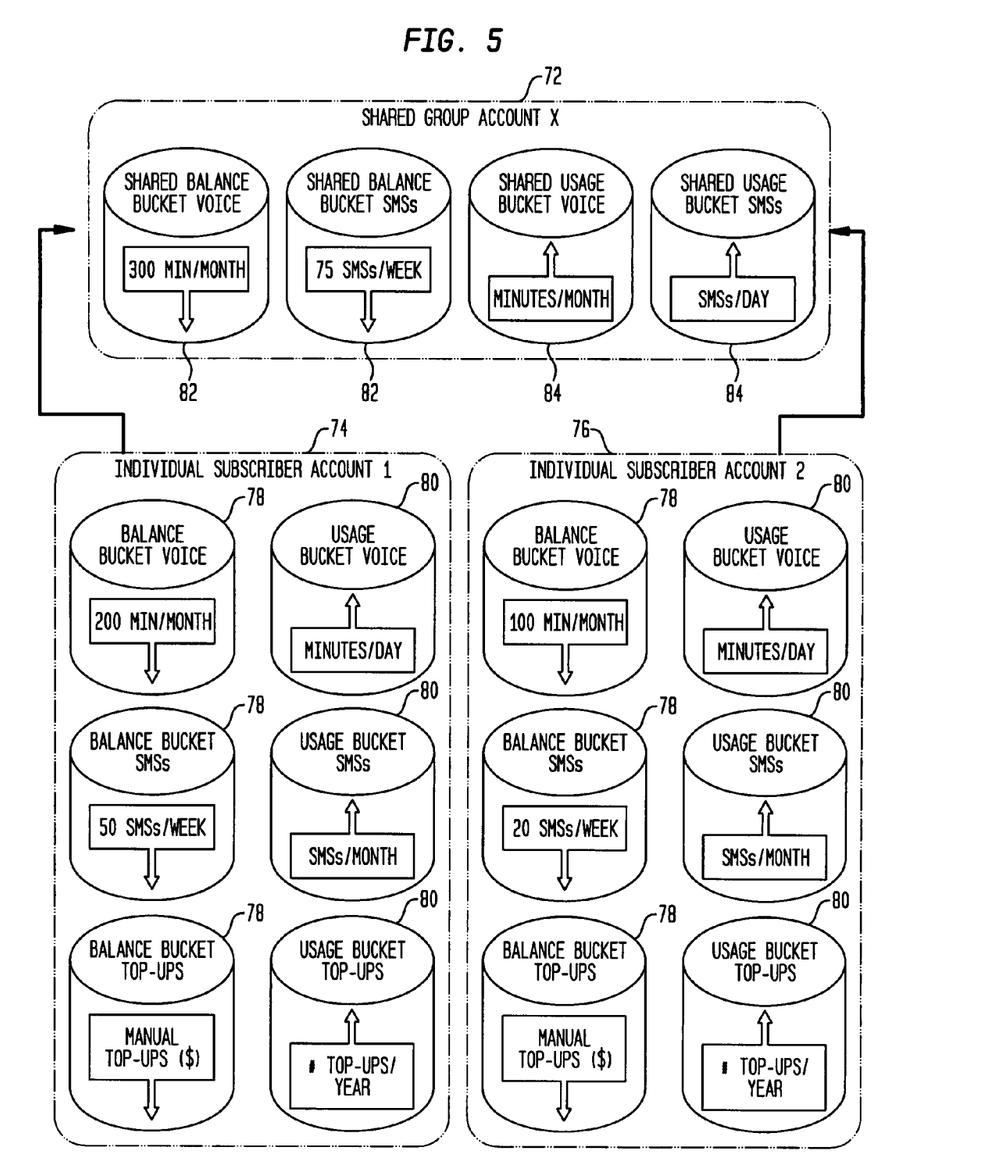
FIG. 5 is a depiction of the hierarchical buckets in accordance with an embodiment of the present invention.

FIG. 5 depicts a Shared Group Account (X) 72 which is created with two Individual Subscriber Accounts (1 and 2) 76 and 76 linked into it showing the bucket hierarchy. Each Individual Subscriber Account 76, 76 has multiple Balance Buckets 78 and Usage Buckets 80 associated with it. In addition, the Shared Group Account 72 has several Shared Balance Buckets 82 and Shared Usage Buckets 84 associated with it. The power of the hierarchical bucket structure can be demonstrated with the following examples of how rating rules can be defined for voice calls. When Subscriber 1 makes/receives a call, Balance Buckets 78, 82 are decremented as follows. If it is a call to/from a number on a pre-specified list, deduct minutes from the Shared Voice Balance Bucket 82 at the Group Account X level 72. If that balance bucket is empty, next try to deduct minutes from the Individual Voice Balance Bucket 78 at the Subscriber Account 1 level 76. If that balance bucket is empty, next try to deduct money from the Individual Top-Up Balance Bucket 78 at the Subscriber Account 1 level 76 at a rate of $0.15/minute.

If it is a call to/from a number NOT on the pre-specified list, deduct minutes from the Individual Voice Balance Bucket 78 at the Subscriber Account 1 level 76. If that balance bucket is empty, next try to deduct money from the Individual Top-Up Balance Bucket 78 at the Subscriber Account 1 level 76 at a rate of $0.20/minute.

When Subscriber 1 makes or receives a call, Usage Buckets 80, 84 are incremented as follows. Every minute of voice usage results in the incrementation of one minute in both the Shared Voice Usage Bucket 84 at the Group Account X level 72 as well as the Individual Voice Balance Bucket 80 at the Subscriber Account 1 level 76.

Similar rules could apply for SMS, content, and other bucket types, e.g. multimedia messaging service (MMS), LBS, etc. In addition, since multiple balance and usage buckets can be defined at the subscriber and group levels, and multiple rating rules can be written for how usage is applied to these balance and usage buckets, there are virtually limitless possibilities in how usage can be tracked and charged at various hierarchical levels.

The rating engine 48 uses function expressions and table references in its rule language. Function rating makes it possible to write complex rating rules without the need for executable code. RCS 10 includes a rule editor, and a graphical user interface (GUI) that provides an easy, flexible way for the service provider to view, find, create, and modify the rules that make up a price plan. New price plans can be created to try out existing promotions without impacting the existing plans currently implemented for subscribers.

In RCE 10, a price plan is made up of a set of rules of various types. Five types of rules are supported in one embodiment of the present invention: rating rules, discounting rules, revenue sharing rules, sponsorship rules and bonus rules. In this embodiment, rating engine 48 processes all five rule types. These rules are described as follows.

Rating rules 50 establish the normal price of a transaction. For example, a peak airtime rate rule establishes the normal price for a unit of airtime purchased during a particular time period. Rules are matched based on subscriber information and the transaction details. There may be call set-up charges, minimum charges, fixed rate per unit rating, tiered/step-down rating, usage-based/slab-wise rating, location based rating, i.e., roaming versus non-roaming, rates based on time of day and day of week, rates based on subscriber information, i.e., special birthday rates, and rates based on transaction information, i.e., different rates based on the dialed number. Mathematical expressions and reference data may also be incorporated, e.g. from tables.

Discounting rules lower the rated prices. Multiple discount rules may be applied to a single transaction. Discounting rule definitions can include: fixed rate per unit discount, percentage discount, tiered/step-down discount, location based discounts, discounts based on time of day/day of week, discounts based on subscriber information, period discounts, i.e., reduced rates for a specified period, and other events or timing criteria.

Revenue sharing rules enable a portion of the charge to be designated to another company, e.g., six percent of the rate for government tax or 0.25 cents per hour credited to the local access company. Share amounts are computed in currency and are associated with a share account, defined in the rule. Revenue may be shared with multiple accounts. Details of revenue sharing are recorded in CDRs for reconciliation by back-end systems.

Sponsorship rules enable a third party to pay for part or all of a transaction, e.g., if the subscriber listens to a promotional announcement at the start of the call, a sponsoring company will pay the first twenty five cents of the call. Like discounts rules, sponsorship rules lower the rated price of the transaction. Sponsorship details are recorded in CDRs for reconciliation by back-end or back office systems.

Bonus rules manage the award of bonuses to subscribers, such as one free SMS message for every 100 minutes of long distance usage. Bonus rules define whether the bonus should be applied to an existing bucket or whether a new bucket should be added to the subscriber's account. Bonuses can be given in currency, talk time, number of SMS messages, volume of session time, number of downloads and other forms. Bonus rules can be used to set-up the initial buckets for a subscriber, as well as to award promotions. For example, activation of a new phone within several days of purchase could result in a bucket of twenty-five free SMS messages. Bonuses can also be rewarded after specified usage, for example, ten free SMS messages awarded after the SMS usage bucket reached a pre-defined threshold. These bonuses are usually awarded at the end of a transaction. Voucher recharge provides a bonus rule that maps a voucher type to a set of bucket changes such as adding $25.00 to the core balance bucket and creating a time-limited free minutes balance bucket. Payment gateway recharge provides a bonus rule that is used to provide bonuses and promotions when credit/debit or ATM recharges are performed. Periodic charging bonus rules combined with rate rules provides the ability to charge for subscriptions and rental fees, i.e., bonus rules can be used to add new buckets or increment existing buckets with a periodic award or subscription.

Rules are grouped together into rule sets. Within a rule set, multiple rule groups may be defined to represent a product such as voice, SMS or data. Only rules within the specified rule set and the appropriate rule group within the rule set are valid for a particular transaction. All rules are assigned a priority to define the applicability of each rule within a rule group. Each rule can reference any subscriber bucket of any subscriber for cross-product discounts and bonuses, and can specify the order in which subscriber buckets are consumed. This capability enables bonuses and rewards to be used first, followed by action-specific balances and finally core balance buckets. Qualifiers can be used to further partition rules. Qualifiers include profile identifier, product type, e.g., voice, SMS or data, product subtype, e.g., Mobile Originated (MO), Mobile Terminated (MT), Ringtones, Tariff Group, F&F indicator, Home Zone indicator, Special Date, Intra-Group indicator, and others. Some qualifiers are dependent on whether the feature is enabled for the particular subscriber, e.g., F&F indicator, Home Zone indicator.

As discussed above, during real-time processing, the RCS 10 invokes the rating engine 48 to rate the transaction, provide discounts and compute bonuses as described in more detail below. Subscriber account information, including price plan, balance buckets, usage buckets, and the transaction details, including time, date, location, and type, are given to the rating engine, which uses this data to determine the rules relevant to the transaction. Once the relevant rules are determined, they are applied based on their priority in the following sequence: the highest priority rating rule is applied to establish the base price of the transaction; the appropriate discount rules are applied to lower the price of the transaction; the revenue sharing and sponsorship rules are applied to determine the portion of the transaction to be shared or charged to another party; and, finally, at the end of the transaction, bonus rules are applied to compute any new bonuses based on the historical information, i.e., usage, or current date/time. The charging details are returned to the service logic 46 to be applied to the subscriber's account balance buckets 54 and usage buckets 64.

Charging is done by RCS 10 at the beginning of the transaction. At the end of the transaction, e.g., at the end of a call or data session, the service logic 46 invokes the RCS 10 again to determine the unused portion of the charge to be returned to the subscriber's account balance and to calculate any applicable bonus. For example, at the beginning of the call, the subscriber is charges $1.00 for five minutes. At the end of the two minute call, sixty cents is returned to the subscriber's account balance and a bonus of five free SMS messages is given to the subscriber for crossing the 100 minutes/month threshold. The charging quanta, i.e., the five minutes in the example, is fully configurable by the service provider.

The rating engine 48 of the RCS 10 will attempt to use the specified buckets 53, starting at the top of the list defined with the rating rule 50, and continuing down the list until the entire charge for the transaction has been paid or allocated. If the first bucket has insufficient quantity to pay for the transaction, it is debited until it is empty and the next bucket is used for the remainder. If more than one balance bucket of the same type is available, the buckets are used in order of earliest starting date followed by earliest expiration date.

Individual subscriber accounts stored in the subscriber database 14 comprise all the required data, balances and features to process transactions. These parameters include profile id, account balance, account status, account expiration date, preferred language, account PIN, home time zone, and, optionally, include national long distance operator, international long distance operator, Free/Barred/Always (FBA) list, F&F list, special date feature indicator, inbound and outbound screening lists, home zone feature indictor, short code translation list, and others defined by the service provider. Each subscriber can be assigned to a profile. Profiles bundle together subscribers with a common price plan, level of service and set of features.

Account lifecycle management provides the mechanism for managing and transitioning the status of a subscriber's account based on configuration information defined by the service provider. Every subscriber account has a defined account state. This state is interrogated on every transaction to determine if a state transition is required and whether the current transaction is permitted. In one embodiment, there may be up to ten states configured by a service provider. The service provider may configure all associated state transition rules and all allowed transactions per state. The default account lifecycle management states are defined with fixed transition rules. The "pre-active" state is the initial state to which all subscriber accounts are assigned. In this pre-active state, a subscriber account is set up but not yet activated. No chargeable activities can be performed until the account is moved or updated to the "active" state, in accordance with the configured state transition rules. The "active" state is used to denote a subscriber account that has been activated and is in good standing, i.e., a core balance is above the configured threshold and the account expiration date is valid. A "grace" state is used to denote an account in which the core balance bucket has expired. No chargeable activities can be performed until the account is recharged and returned to the active state, but emergency calls are allowed. An account in an "expired" state has expired and can be removed from the system. No activities, not even emergency activities, can be performed in this state. A CDR is recorded for all state transitions. In addition to account states, a "suspend" flag is available in the subscriber record to temporarily suspend a subscriber's account. This flag is usually set by a CSR when a subscriber's handset is lost or stolen, or when fraud is suspected. No activities can be performed until the account is returned to the active state.

Subscribers can be associated with a group account to which multiple subscribers belong. Group accounts may be used for family plans, business groups, etc. Account features can be defined at the group level or the individual level, i.e. member level, and one or more members may be designated as having group administrator privileges. A transaction between group members sets a qualifier that can be used in rating rules to charge differently for intra-group calls, SMS and/or data. Three types of group accounts are supported: simple, corporate and composite. Simple accounts have one of each data field present in combination of one member or subscriber, and the group data. Accordingly, the balance may be associated with either the group account or with each individual member or subscriber. A corporate account is a version of the simple group account that assembles subscribers into a department account which itself is part of a corporate account. A composite account is an account that has some data fields present at both the group and member levels. For example, both group and individual balance buckets may be defined in a composite account.

Simple group accounts may be set up to have a single account balance and state for the whole group, or separate balances and states for each member. Other features, such as F&F, screening, special date, can be configured at either level. One or more of the group members may be given administrative privileges allowing them to update the account features. Simple group accounts may be set up to be closed user groups (CUGs). In this configuration, members of the group may call or send and SMS to other members of the group only. Select members of the group can also call outside the group.

Corporate group accounts are an extension of the simple group account. Whereas simple group accounts have two tiers with one or more group members having administrative privileges, corporate accounts have three tiers, e.g., Corporation, Department and Employee. Group administration can be defined at two levels. The first level group administrator can transfer balances, i.e. money, to the second level members, and the second level members can transfer balances to the third level members. As with simple group accounts, balances and features can be defined at the group or member level, or both.

Composite group accounts organize data at either the group or the member level, and support a subset of data at both levels. This subset includes the balance and usage data. Other data is available at either the group or member levels. Rate rules may deduct from either the group or the member balance buckets, or the rules may deduct from the member bucket first and when depleted, deduct from the group bucket, or vice versa. Usage may be accumulated at the group or member level or at both levels. In one embodiment, the composite account is implemented as a shared group account as shown in FIG. 5 and described above.

RCS 10 supports both prepaid and postpaid accounts on the same platform. Service providers can segregate subscribers on a profile basis as prepaid or postpaid subscribers with or without an override option as follows. For prepaid subscribers, all transactions are treated as prepaid transactions. The rating engine 48 is invoked to rate each transaction and the charge for the transaction is applied to the appropriate bucket 53 in the subscriber's account balance. A CDR is written for all account modifications. For a postpaid subscriber, all transactions are treated as postpaid transactions. The service provider has the option to configure the service logic 46 to record the transaction in a CDR, or to perform rating and record the usage. If the transactions are rated, the account balance can be configured with a defined balance amount, e.g., $50.00, that is decremented until the balance is depleted, at which time no further transactions are allowed. The default balance amount is zero (0) but the service provider can permit a negative balance, for example, –$100, after which the subscriber is cut off. In the alternative, the account balance can be configured with an expiration date before which all transactions are allowed. Spending limits can be defined so that when a limit is reached, the subscriber is alerted and/or further usage is prevented or blocked. The service provider can configure buckets to remain or to be deleted when empty or depleted. A CDR is written for all account modifications and can be used by a billing module to generate invoices for the subscriber. Alternatively, in networks using the GSM protocol, the rating information can be sent to the networks (via FurnishChargingInformation message) to include in the Mobile Switching Center (MSC) CDRs.

Prepaid accounts with override treat all transactions as prepaid transactions unless the subscriber enters pre-defined override digits. When the override digits are present, the account is treated as a postpaid account as described above. Otherwise, it is treated a prepaid account, so that a CDR is written for all account modifications.

Two methods are provided to recharge a subscriber's account balance. An EDB 16 voucher management system (VMS) enables service providers to offer vouchers as a recharge option. Alternatively, the ISA interface to a payment gateway provides a direct credit option. The EDB 16 provides for the creation and secure management of recharge vouchers. Each voucher includes at least an expiration date, state, e.g. used, blocked, etc., type, expiration extension, and service provider identifier. Using bonus rules, a service provider can map a voucher type to an amount in currency, time and units, and a set of bucket changes. Associating voucher type with bonus rules gives the service provider flexibility in offering temporary promotions that can be differentiated by price plan. The bonus rules can be set up to specify that the voucher is to be applied to an existing balance bucket and that the bucket's expiration date be extended, or to a new bucket to be added to the subscriber's account or subscriber information. Requests to apply a voucher come either through the network as SMS or IP transmissions, the customer presentation layer (CPL), or through the CRM via the ISA interface. The service logic 46 validates the voucher, applies the voucher rules and adds the amount of money, minutes, and number of downloads, etc., to the appropriate account balance in the corresponding balance bucket 54. The voucher type can be tied to a profile identifier and a set of price plans. When the subscriber recharges with a specific voucher type, the new price plans will be applied to the subscriber account.

The ISA interface, e.g. CORBA or SOAP/XML, can be integrated with third-party IP-based systems, e.g., customer service, payment centers, credit card clearinghouses, to enable direct credit to be added to the subscriber's account balance. Credit types may be associated with bonus rules to give the provider flexibility in offering temporary promotions that can be differentiated by price plan. The bonus rules can be set up to specify that the credit be applied to a new or existing balance bucket, and a bonus balance bucket be added to the subscriber's account, e.g., add $25.00 to an account during a specific period and get ten free SMS messages.

An emergency number list can be implemented so that the operator of the system can provision or enable a list of destination numbers, based on country of origin, for which no call management is performed. At the start of all mobile originating and terminating voice calls, the emergency list is examined for the dialed number. If a match is found, the call is immediately connected or continued with no further involvement of the RCS 10. The emergency numbers are free and are always accessible irrespective of the account balance, account state or account expiration date. Some MSCs will bypass service invocation when an emergency number is dialed. Free numbers are always accessible irrespective of the account balance, while barred numbers are never reachable by the subscriber. Always numbers are charged but are always accessible, that is, all screening is bypassed.

The service provider can also create or provision a set of numbers or number prefixes for special processing. Two separate lists are supported. One list is a subscriber level list, while the other list is applicable on the service provider or profile level. The FBA list is consulted on originating, forwarding and terminating voice, SMS and data, e.g. MMS, services. Call termination support enables the service provider to configure calls from customer service as free. For each number in the list, a service type and an FBA indicator is set. Longest prefix matching and exact match lookups are supported.

Figure 6:
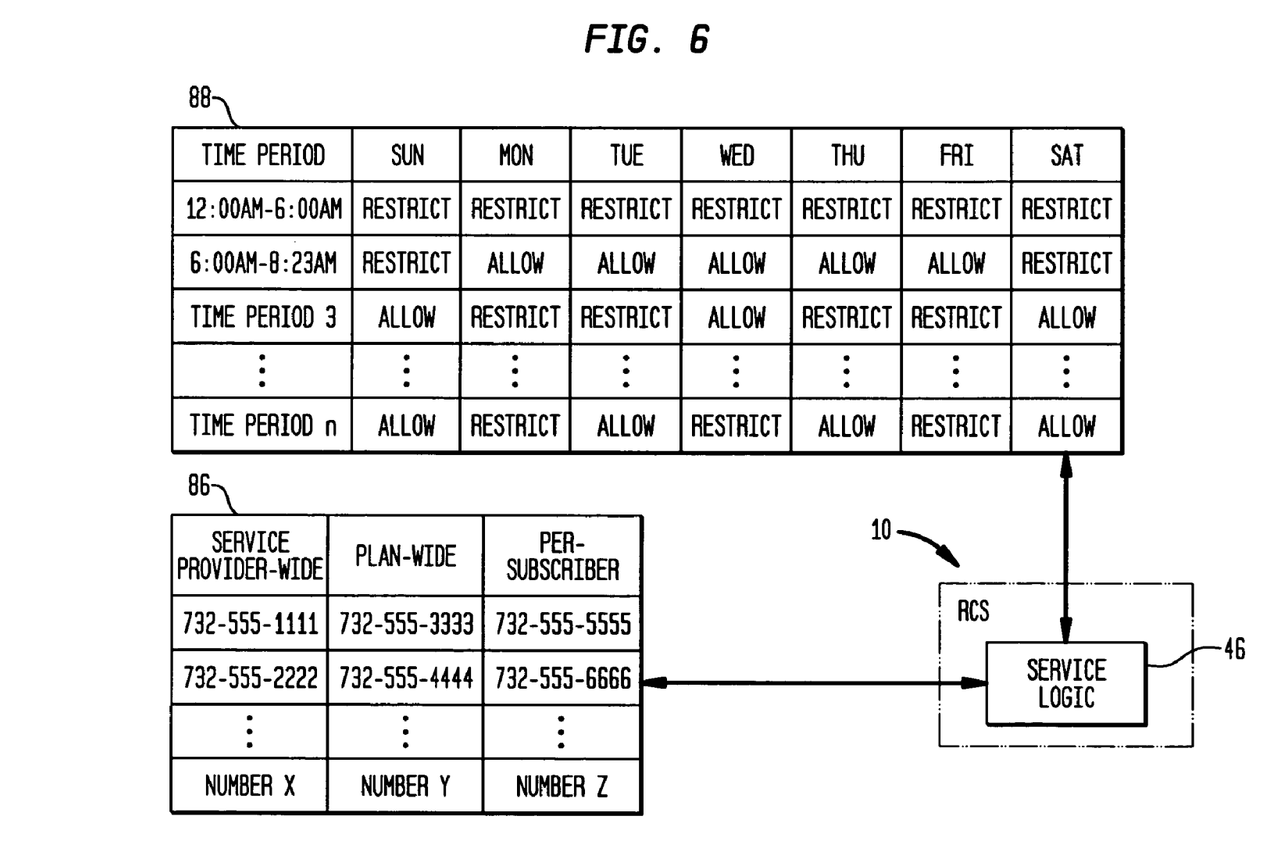
FIG. 6 is a diagram depicting calendar restrictions with selective bypass in accordance with the present invention.

Further, at the subscriber level, a calendar or weekly set of restrictions during which time all transactions are barred (Voice, SMS, Data) can be implemented by the service provider. Various Calendar Bypass Tables 86 can be used for processing in accordance with these calendar restrictions. In one embodiment, the calendar is defined as a set of up to ten time ranges and the associated days of the week for which the restriction applies. FIG. 6 illustrates an embodiment of RCS 10 having calendar restrictions. Upon an originating or terminating call attempt, a telecom switch sends a signaling query message to a service provider's server on which RCS 10 is implemented. The server invokes the service logic 46 associated with the calling/called party. The service logic 46 consults the various Calendar Bypass Tables 86, e.g., service provider-wide, plan-wide, and per-subscriber. If the called number (in the case of an originating call attempt), or the calling number (in the case of a terminating call attempt) is on any of these bypass lists, the call is allowed to connect or continue. However, if the called number (in the case of an originating call attempt) or the calling number (in the case of a terminating call attempt) is not on any of these bypass lists, the service logic 46 consults the appropriate cell in the Calendar Restriction Table 88 based on the current day and time. If the cell indicates that this period is "Allowed", the call connects or continues. However, if the cell indicates that this period is "Restricted", the call is blocked or terminated.

Friends and Family (F&F) is a rating option that enables the service provider to offer lower rates or discounts based on calls, SMS and MMS to and from a number on the F&F list. Each customer who subscribes to this feature maintains his or her own list of numbers. The service logic 46 consults this list on all voice, SMS, MMS and other data transactions and, if the dialed digits (on call origination) or calling party number (on call termination) match a number on the list, the RCS 10 will apply a lower rate or a discount, or will direct charges to a specific bucket 53 as specified in the rating rules 50.

The service provider can configure a profile based on the maximum allowed entries in the F&F list. The subscriber can review and update the F&F list via the ISA interface, i.e., ISA integrated into the service provider's web portal. The F&F feature gives the service provider the capability to define specific rating and discount rules based on the numbers on the subscriber's F&F list. Using discount rules, a ten percent discount can be applied to calls dialed to anyone on the F&F list and/or a lower five cent per message rate can be applied for mobile-originated SMS (MO-SMS) to anyone on the F&F list. The service provider can further define that these discounts and rates be applied only when the subscriber is in the home network.

Group analysis is a rating and screening option for members of a group. When a subscriber is a member of a group account, the service provider has the option to define lower rates or discounts, or to deduct from different buckets if the transaction is between members of the group. When the subscriber is a member of a group account, a flag is set that can be incorporated into the rating rules 50. In addition, for members of a CUG, the transaction will be rejected if the destination number is not a member of the CUG and the subscriber is restricted to calling and/or sending SMS only within the CUG.

Home zone is a rating option that enables the service provider to assign each subscriber to a home zone based on "physical" location. On voice, SMS and data services, when location information is present, the service determines whether the subscriber is in his or her home zone and, if so, the RCS 10 will apply a lower rate or discounts as specified in the rating rules 50. If the location of the subscriber is not provided in the voice, SMS or data message, the service can optionally query the home location register (HLR) to retrieve the subscriber's current location.

The inbound screening option, configured at the subscriber level, defines a screening list for both allowed and barred call terminations. A list of phone numbers is consulted on every incoming call and mobile terminated SMS (MT-SMS) to determine if the call or SMS should be connected or rejected. The entire list of numbers is designated as either allowed or restricted. The subscriber can activate and deactivate this feature, and can also view and update the numbers on the list via the ISA interface, i.e., ISA integrated into the service provider's web portal.

Outbound screening option, configured at the subscriber level, defines a screening list for both allowed and barred call originations and MO-SMS. A list of phone numbers is consulted on every call origination and MO-SMS to determine if the call or message should be connected or rejected. Similar to the inbound screening option, the entire list of numbers is designated as either allowed or restricted. The subscriber can activate and deactivate this feature, and can also view and update the numbers on the list via the ISA interface, i.e., ISA integrated into the service provider's web portal.

In-network calling is a rating option that enable the service provider to offer lower rates or discounts on calls to and/or from a number in the service provider's network. On voice calls, the service determines whether the subscriber is dialing a number in the home network and, if so, the RCS 10 applies a lower rate or discount as specified in the rating rules 50.

The periodic charging option enables the service provider to charge recurring fees, or periodic charges, to be deducted from a subscriber's account according to a configured interval, e.g. daily, monthly, etc. The actual charge is calculated by a set of rating rules 50. Once the fee is determined, the bonus rules for periodic charging are invoked to provide any applicable bucket updates. For example, on the fifteenth of every month, $29.99 can be deducted from the subscriber's core balance and 500 minutes added to the subscriber's anytime minutes bucket.

Periodic charges are applied on the first transaction of the day, on activation of a time-based trigger set in a Subscriber Database scanning process by the service provider, and on recharge. In each case, the recurring fee is applied when the configured interval is less than or equal to the current date. If the subscriber balance is insufficient to pay the periodic charge, the fee is charged on the next balance recharge whether by voucher, debit or bonus award. The service provider can conjure unpaid charges to be recouped once or for every missed interval. In addition, the periodic change rate rules can be defined to accumulate all missed periodic charges in a pending bucket and allow any associated features to remain enabled. On recharge, the recharge bonus rules can be defined to apply pending changes before updating the balance buckets 54. PPAD is a tool that periodically scans the subscriber database 14 for records that meet conditions set by the service provider, e.g., all accounts whose account expiration is less than one week from today, and executes service logic 46 associated with that condition, e.g., send an SMS alert. Alternatively, the service provider can use this feature to generate a report of those subscribers meeting the specified condition, e.g., the number of subscribers in the expired state or sum of all subscriber account balances. Recurring charges, subscription charges and account alerts can be implemented using this tool.

The spending limits option enables a service provider to define, at the subscriber level, a set of spending limits or spending limit allowances and associated usage buckets. These usage buckets are incremented on each transaction according to the service provider's rate plan. The spending limit allowances are used in conjunction with usage alerts to notify a subscriber when the usage crosses a configured level. Using this feature, subscribers can monitor their prepaid or postpaid usage, and, if desired, automatically terminate usage if a limit is exceeded.

Usage tracking enables the subscriber to track costs associated with a particular call using a particular bucket. The feature can be used, for example, to separate personal versus business usage or to identify usage associated with a particular project or customer. When the subscriber makes a call, the total cost of the call is added to the appropriate usage bucket. Two methods of tracking usage are provided. In "by prefix" tracking, the subscriber enters one of a set of prefix codes defined by the service provider prior to the actual dialed destination. Each prefix code is used to indicate which usage bucket is used for tracking the cost of the call. The dialed prefix is removed from the dialed digit string prior to instructing the MSC to route the call to the destination. In "by dialed number" tracking, a list of destination numbers is mapped to a usage bucket. This mapping is configured at the subscriber level. Up to five destination numbers can be defined. The accumulated values of usage tracking buckets can be retrieved and reset via SMS or SAM ISA.

The Data and Report System (DRS) component of RCS 10 serves as an aggregation point for CDRs and system and services measurements. The DRS also supports ad hoc report generation for data retrieval, formatting and output. Detail records and measurements are stored for a configured period of time, e.g., ten days, and may be used directly or downloaded (via SQLNet) to a data warehouse 22. Alternatively, detail records can be transferred to traditional collection systems using a file transfer utility, such as ftp, tftp, rcp, CD/DVD burn, etc.

RCS 10 generates samples or detail records for all updates to the subscriber account. Detail records can be used for billing, for online call logs, to analyze calling patterns and to resolve charging problems. Samples are recorded in the following situations: (i) at the end of a call; (ii) on sending an SMS; (iii) on download of a ring-tone; (iv) at the end of a data session; (v) on all account updates; (vi) on recharge; and, (vii) for any errors. All samples are fully configurable by the service provider and can be recorded on DRS or transferred to traditional collection systems using a file transfer utility. For all transactions, a default sampling structure is available and includes all the available information about the transaction, e.g., call type, dialed digits, subscriber location, cost of call, etc. The service provider can customize the sampling structure to enable the generation of customized detail records. This customization provides maximum flexibility in generating samples without the need for modification to the rest of the prepaid service.

The SPACE system is the element manager used for provisioning and management of subscriber records, EDB vouchers and rating rules 50. SPACE functionality includes the SPACE service creation environment that is used to manage and configure service data and activate changes to the CAS onboard database. The SPACE IDL interface SII is an open CORBA interface used to enable external provisioning systems and OSS/BSS systems to provision subscriber records to the CAS onboard database. The EDB 16 maintains voucher records in a secure manner, validates voucher/PIN numbers, and marks vouchers used in real-time on recharge.

Rule Set Management is a set of tools used to activate rule sets, created using the RCS 10 rule editor, to the CAS onboard database. Once provisioned on SPACE and activated to the CAS cluster, any updates to subscriber account information, e.g., bucket changes, must be made through the SAM ISA interface.

Hence, RCS 10 can be used to implement a subscription plan that can be defined using a combination of rating rules 50 and bonus rules. As an example, a $39.99/month subscription plan could be defined so that the subscriber receives 500 anytime minutes, 500 off-peak minutes and unlimited SMS messages. In this example, the subscriber will need at least four balance buckets 54: core, anytime minutes, off-peak minutes, and MO-SMS subscription as illustrated in Table I. The subscriber will also need at least four usage buckets 64: monthly money spent, monthly peak minutes, daily minutes, and monthly SMS as shown Table II.

TABLE I

| Bucket Identifier | Bucket Name | Unit | Expiration Date | Balance |
|---|---|---|---|---|
| 1 | Core | Dollar | Jun. 30, 20XX | $ 25.00 |
| 2 | Anytime Minutes | Minutes | May 15, 20XX | 300 |
| 3 | Off-Peak Minutes | Minutes | May 15, 20XX | 500 |
| 4 | MO-SMS Subscription | SMS | May 15, 20XX | Unlimited |

TABLE II

| Bucket Identifier | Bucket Name | Refresh Period | Next Rest Date | Count |
|---|---|---|---|---|
| 7 | Monthly Money Spent | Month | Apr. 1, 20XX | 1500 ($15.00) |
| 8 | Monthly Peak Minutes | Month | Apr. 1, 20XX | 100 |
| 9 | Daily Minutes | Day | Mar. 31, 20XX | 12 |
| 10 | Monthly SMS | Month | Apr. 15, 20XX | 18 |

A bonus rule can be defined to add 500 minutes to the Anytime Minutes and the Off-Peak Minutes buckets and to extend the expiration date by one month for the Anytime Minutes, Off-Peak Minutes and MO-SMS Subscription Buckets. The bonus rule can be invoked by an external system once the $39.99 is paid to the service provider, or a periodic charge can be set up to automatically invoke the bonus rule on a monthly basis. In conjunction with the bonus rule, rating rules are defined for voice and SMS to charge a rate of zero (0) as long as the expiration rate in the appropriate bucket is valid. All other charges, e.g., MT-SMS and ringtone downloads, are charges against the core bucket.

Using the bonus rules, service providers can quickly and easily define special offers or promotions. Bonuses can be given in currency, talk time, number of SMS messages, data session time, number of ringtone downloads, i.e., any type of unit defined by the service provider. Promotional bonuses can be achieved by a single subscriber or accumulated by multiple subscribers in a group account. Many types of promotions can be defined, including, but not limited to, time based promotions and usage-based promotions. Time based promotions include providing five free SMS messages upon account activation within a certain period, providing a discount of a certain amount to all calls to or from a certain country, and providing bonus minutes to those that call a certain country during a promotional period. Other time based promotions can also be generated. A sample time-based promotion gives the subscriber free SMS messages for a week and then charges the subscriber a monthly SMS fee. The service provider may offer the promotion on its website. When the subscriber signs up on the website, an ISA message is sent to the RCS 10 to either directly insert a new bucket into the subscriber's account or to invoke a bonus rule to insert a new bucket. For example, if instructed, RCS 10 adds, to the subscriber's account, a new bucket for "Bonus SMS" with an expiration date seven days from the bonus award date. At the same time, another ISA message can be sent to insert a periodic charge for the subscriber that starts seven days from the bonus award date.

Usage based bonuses include providing a number of free SMS messages after a certain number of messages are sent, for example, five free messages after the first fifty, or proving a bonus of five free minutes of voice calls if more than $5.00 is spent in a weekend.

Many additional usage based promotions can be created. One sample promotion gives the subscriber who has spent $50.00 in a month ten bonus SMS messages that expire in fifteen days. To implement this promotion, the bonus rule defines a new bucket for Bonus SMS with an expiration date fifteen days from the bonus award date. At the same time, the service provider can define a new rate rule that allows this bucket to be used before the paid SMS buckets and only when the subscriber is sending an on network to on network SMS message.

Another sample promotion provides the subscriber with five SMS messages on top-ups of $25.00 and ten free SMS messages on top-ups of $25.00 or more. To implement this promotion, RCS 10 creates a new bucket for Bonus SMS with an expiration date thirty days from the bonus award date. Again, the service provider can define the new rate rule that allows this bucket to be used before the paid SMS buckets and only when the subscriber is sending an on network to on network SMS message.

While the present invention has been described in particular embodiments, it should be appreciated that the present invention should not be construed as limited by such embodiments, but rather construed according to the below claims.

What is claimed is:

1. A method, comprising:
    receiving a service request for a requested service at a computer, the computer configured to access a plurality of rating rules;
    determining a charge for the requested service at the computer based on at least one rating rule of the plurality of rating rules and a tag, wherein the tag is based on at least one of information in the service request, network provided data, configuration data, and subscriber data; and
    generating, at the computer, one or more balance buckets for tracking a balance of the requested service and one or more usage buckets for tracking a usage of the requested service based on the at least one rating rule of the plurality of rating rules.

2. The method of claim 1, further comprising:
    generating a call detail record at the computer regarding the requested service.

3. The method of claim 1, further comprising:
    indicating that the service request is allowable at the computer based on a time of the service request and a calendar set of restrictions.

4. The method of claim 1, further comprising:
    creating one or more shared balance buckets and one or more shared usage buckets at the computer, each shared balance bucket and each shared usage bucket for a group of subscribers, wherein each balance bucket and each usage bucket for each subscriber in the group of subscribers is at a lower level of a hierarchy than the shared balance buckets and the shared usage buckets for the group of subscribers.

5. The method of claim 1, wherein one or more of the balance buckets have an associated expiration date after which any remaining balance cannot be used.

6. The method of claim 1, wherein each usage bucket has a reset date after which date the usage bucket will be reset to zero.

7. A system, comprising:
a computer, comprising:
memory that contains a plurality of rating rules; and
software that causes the computer to perform operations comprising:
receiving a service request for a requested service;
determining a charge for the requested service based on at least one rating rule of the plurality of rating rules and a tag, wherein the tag is based on at least one of information in the service request, network provided data, configuration data, and subscriber data; and
causing a rating engine to generate one or more balance buckets for tracking a balance of the requested service and one or more usage buckets for tracking a usage of the requested service based on the one of the one or more rating rules.

8. The system of claim 7, wherein the operations further comprise:
generating a call detail record regarding the requested service.

9. The system of claim 7, wherein the operations further comprise:
indicating that the service request is allowable based on a time of the service request and a calendar set of restrictions.

10. The system of claim 7, wherein the operations further comprise:
creating one or more shared balance buckets and one or more shared usage buckets, each shared balance bucket and each shared usage bucket for a group of subscribers, wherein each balance bucket and each usage bucket for each subscriber in the group of subscribers is at a lower level of a hierarchy than the shared balance buckets and the shared usage buckets for the group of subscribers.

11. The system of claim 7, wherein one or more of the balance buckets have an associated expiration date after which any remaining balance cannot be used.

12. The system of claim 7, wherein each usage bucket has a reset date after which date the usage bucket will be reset to zero.

13. A system, comprising:
means for receiving a service request for a requested service;
means for accessing a plurality of rating rules;
means for determining a charge for the requested service based on at least one rating rule of the plurality of rating rules and a tag, wherein the tag is based on at least one of information in the service request, network provided data, configuration data, and subscriber data; and
means for generating one or more balance buckets for tracking a balance of the requested service and one or more usage buckets for tracking a usage of the requested service based on the at least one rating rule of the plurality of rating rules.

14. The system of claim 13, further comprising:
means for generating a call detail record regarding the requested service.

15. The system of claim 13, further comprising:
means for indicating that the service request is allowable based on a time of the service request and a calendar set of restrictions.

16. The system of claim 13, further comprising:
means for creating one or more shared balance buckets and one or more shared usage buckets, each shared balance bucket and each shared usage bucket for a group of subscribers, wherein each balance bucket and each usage bucket for each subscriber in the group of subscribers is at a lower level of a hierarchy than the shared balance buckets and the shared usage buckets for the group of subscribers.

17. A non-transitory computer-readable medium having instructions stored thereon, the instructions comprising:
instructions to receive a service request for a requested service at a computer, the computer configured to access a plurality of rating rules;
instructions to determine a charge for the requested service based on at least one rating rule of the plurality of rating rules and a tag, wherein the tag is based on at least one of information in the service request, network provided data, configuration data, and subscriber data; and
instructions to generate one or more balance buckets for tracking a balance of the requested service and one or more usage buckets for tracking a usage of the requested service based on the at least one rating rule of the plurality of rating rules.

18. The non-transitory computer-readable medium of claim 17, further comprising instructions to generate a call detail record at the computer regarding the requested service.

19. The non-transitory computer-readable medium of claim 17, further comprising instructions to indicate that the service request is allowable based on a time of the service request and a calendar set of restrictions.

20. The non-transitory computer-readable medium of claim 17, further comprising instructions to create one or more shared balance buckets and one or more shared usage buckets, each shared balance bucket and each shared usage bucket for a group of subscribers, wherein each balance bucket and each usage bucket for each subscriber in the group of subscribers is at a lower level of a hierarchy than the shared balance buckets and the shared usage buckets for the group of subscribers.

21. The non-transitory computer-readable medium of claim 17, wherein one or more of the balance buckets have an associated expiration date after which any remaining balance cannot be used.

22. The non-transitory computer-readable medium of claim 17, wherein each usage bucket has a reset date after which date the usage bucket will be reset to zero.

* * * * *

UNITED STATES PATENT AND TRADEMARK OFFICE
CERTIFICATE OF CORRECTION

| | | |
|---|---|---|
| PATENT NO. | : 8,195,783 B2 | Page 1 of 1 |
| APPLICATION NO. | : 11/807002 | |
| DATED | : June 5, 2012 | |
| INVENTOR(S) | : Crimi et al. | |

It is certified that error appears in the above-identified patent and that said Letters Patent is hereby corrected as shown below:

ON THE TITLE PAGE:

Item (54), and Column 1, Line 1, Title, delete "CALENDER" and insert -- CALENDAR --, therefor.

Item (75), under "Inventors", in Column 1, Line 9, delete "Gupla," and insert -- Gupta, --, therefor.

On Page 2, in Item (56), under "OTHER PUBLICATIONS", in Column 2, Line 8,
delete "No. PCT/US07/12634,completed" and insert -- No. PCT/US07/12634, completed --, therefor.

IN THE SPECIFICATIONS:

In Column 4, Line 24, delete "EBD" and insert -- EDB --, therefor.

In Column 8, Line 19, delete "dissastisfied" and insert -- dissatisfied --, therefor.

Signed and Sealed this
Sixteenth Day of October, 2012

David J. Kappos
*Director of the United States Patent and Trademark Office*